(No Model.) 3 Sheets—Sheet 1.
P. G. ZOUCK.
BRICK CUTTING AND SANDING MACHINE.
No. 385,398. Patented July 3, 1888.
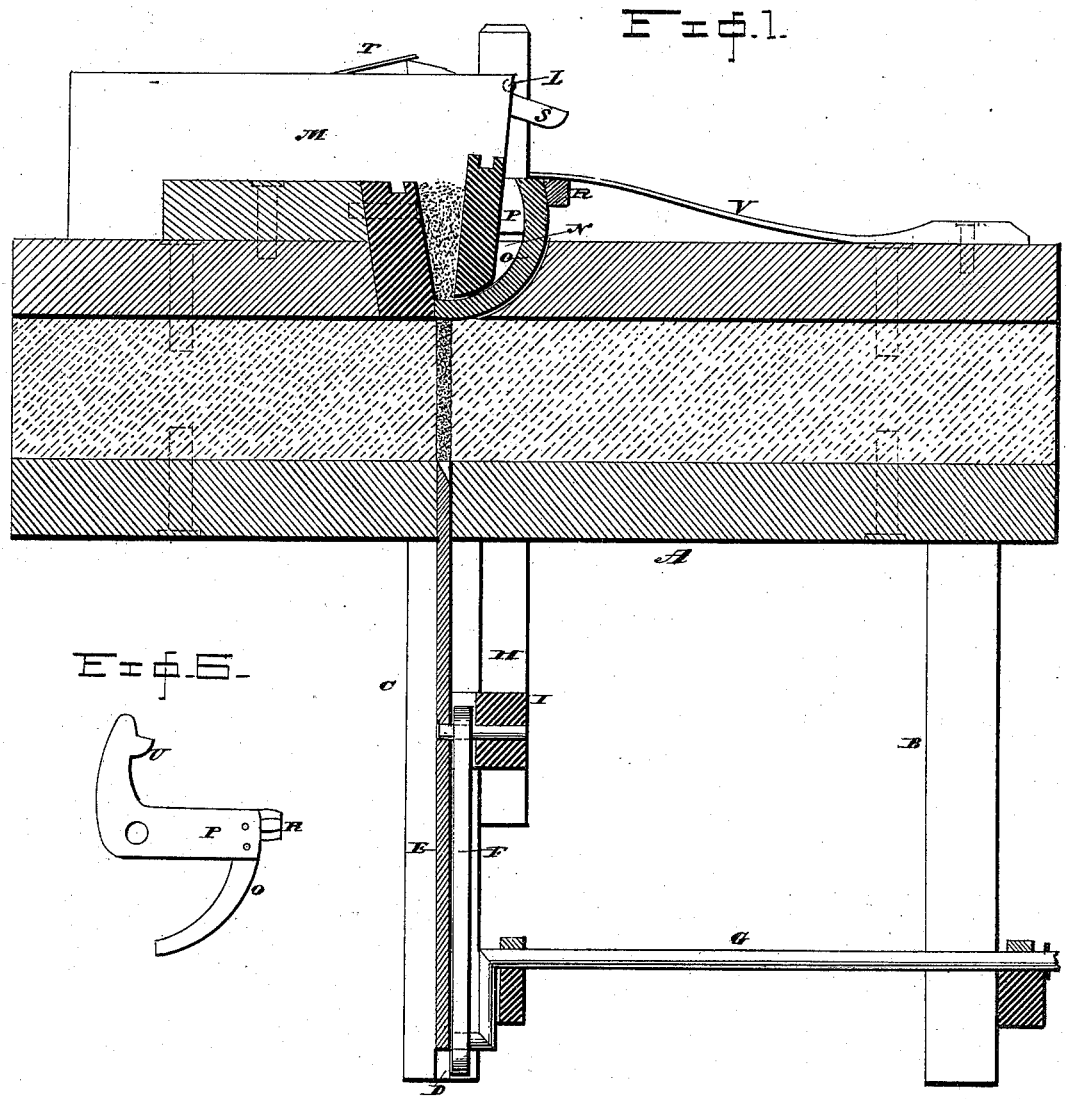
WITNESSES
INVENTOR.
P. G. Zouck,
By his Attorney.

(No Model.) 3 Sheets—Sheet 2.
P. G. ZOUCK.
BRICK CUTTING AND SANDING MACHINE.
No. 385,398. Patented July 3, 1888.
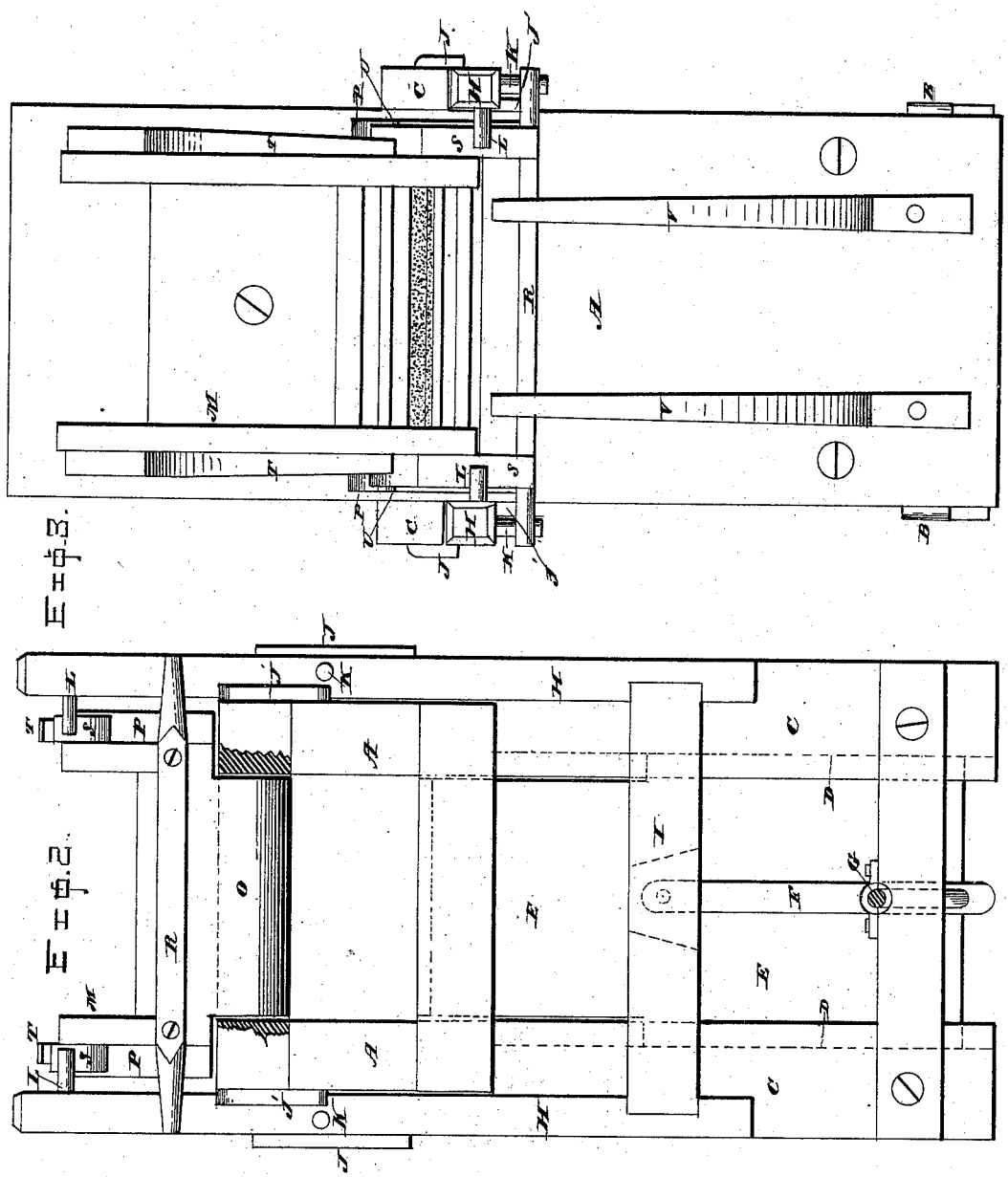
WITNESSES,
INVENTOR,
P. G. Zouck,
By his Attorney.

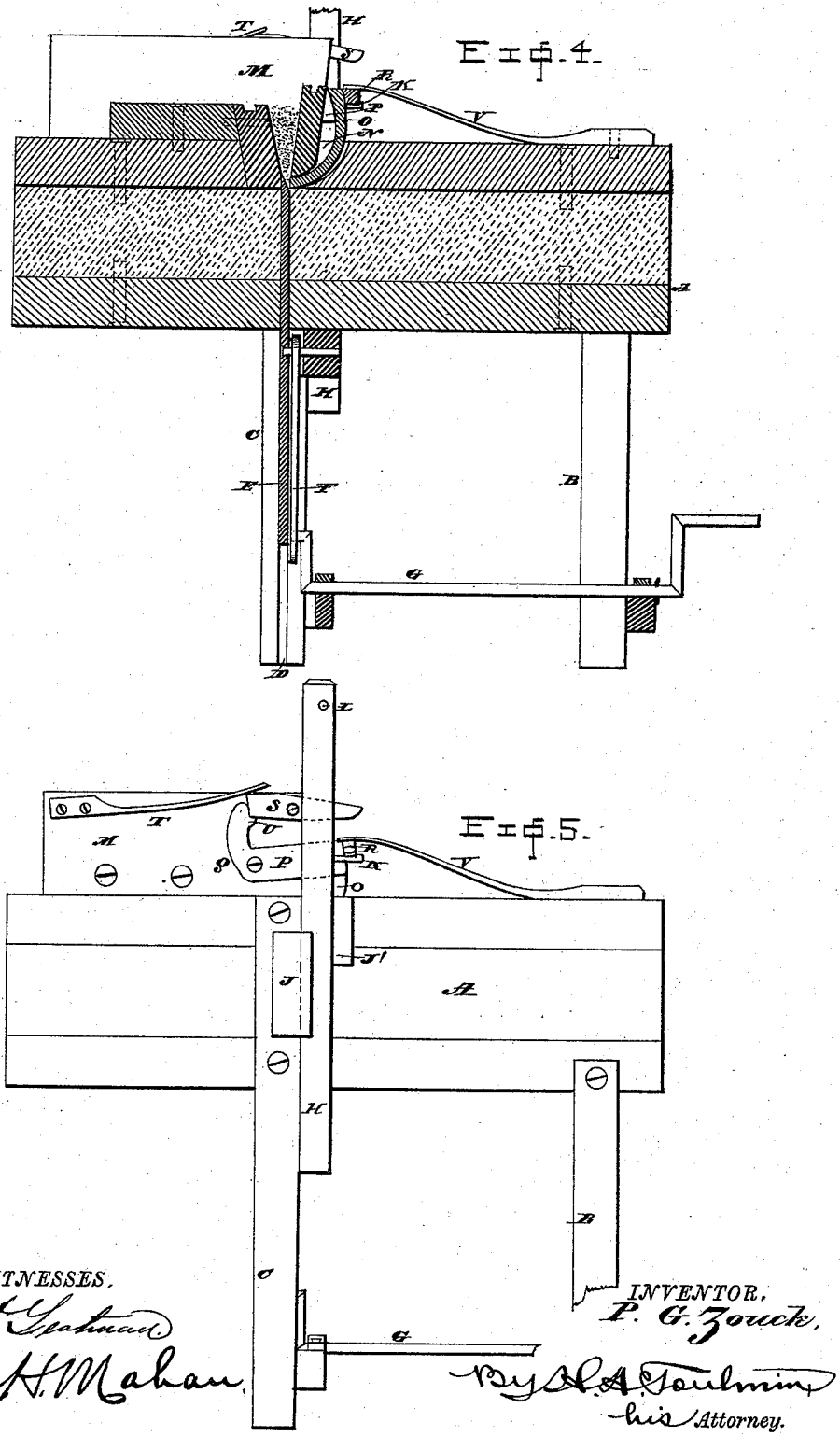

UNITED STATES PATENT OFFICE.

PETER G. ZOUCK, OF GLEN MORRIS, MARYLAND.

BRICK CUTTING AND SANDING MACHINE.

SPECIFICATION forming part of Letters Patent No. 385,398, dated July 3, 1888.

Application filed July 11, 1887. Serial No. 243,968. (No model.)

*To all whom it may concern:*

Be it known that I, PETER G. ZOUCK, a citizen of the United States, residing at Glen Morris, in the county of Baltimore and State of Maryland, have invented certain new and useful Improvements in Brick Cutting and Sanding Machines, of which the following is a specification, reference being had therein to the accompanying drawings.

This invention relates to improvements in brick-machines; and the objects in view are that of cutting off the bar of clay from which the bricks are formed while the bar is yet within the forming-die, and that of sanding—that is to say, applying sand to the ends of the bricks—whereby the completed brick shall be uniform and alike throughout its whole exterior, alike at its ends as well as its sides.

In the art of manufacturing bricks by machines as now practiced the bar of clay which is to be cut into bricks is cut after leaving the dies, usually by means of wires or knives, and the ends of the bricks and bars where the cuts occur are left unsanded—that is to say, are not coated with sand as are the other surfaces of the bricks. This lack of being sanded at the ends is a forcible objection in the trade to such bricks, and quite generally assigns these bricks to use for partition-walls and for the inner parts of the outside walls, the burning of these bricks developing the marks of the cuts made by the wires or knives, and leaving the surfaces unsightly and not desirable for what are called "headers" in the outside of the wall.

My invention consists of a brick-forming die and a clay-cutting device mounted adjacent to the die and constructed to travel transversely thereto and to cut the contained bar of clay, and of the sand-supply mechanism conducting sand to the cut surfaces after the action of the cutting device, and mechanism to actuate the cutting device and control the passage of the sand.

My invention further consists of a blade mounted to reciprocate transversely through the forming-die, so as to cut through the contained bar of clay and form a brick of a section thereof.

My invention still further consists of the said blade, a sand-receptacle, and a valve which normally cuts off the flow of the sand into the die, but is arranged to recede and allow the sand to flow into the die when the blade has severed the bar of clay, and also during the withdrawal of the blade, the valve automatically closing after the blade has exposed the entire cut surface to the action of the sand.

In the accompanying drawings, forming a part of this specification, and on which like reference-letters indicate corresponding features, Figure 1 represents a vertical longitudinal sectional view of a die and my improvements applied thereto; Fig. 2, a front view of the same; Fig. 3, a plan view thereof; Fig. 4, a similar view to Fig. 1, save that the blade is shown projected through the bar of clay and the valve is shown in the receded position; Fig. 5, the side elevation of the die and my improvements; Fig. 6, a side elevation in detail of the valve and one of its arms.

The letter A designates the trough-like structure which constitutes a brick-forming die, and will be understood to be a part of such a die in a brick-machine. It is shown mounted upon standards B and C, the latter being extended inwardly, as seen in Fig. 3, and grooved at D to form a guide, in which the blade E is mounted. This blade is wide enough to snugly fit across the die and cut off the bar entirely, yet without binding unduly against the edges of the die, a transverse slot being formed in the bottom, through which the blade passes and in which it snugly fits. The blade is actuated by any suitable mechanism—as, for instance, a pitman, F, and a crank-shaft, G, mounted in the cross-beams connecting to the standards B and C, the shaft being operated in any convenient manner. The blade moves sufficiently far, as will be observed from Fig. 4, to entirely cut the bar of clay, and has connected with it two uprights, H, through the cross-piece I. These uprights are mounted in the guides J, and are provided with projections K and L—the former for opening the sand-passage by actuating the valve or cut-off, and the latter for operating trip mechanism to allow the valve to return to normal position and cut off the sand. The upper portion of the die is slotted transversely its entire width, and is provided with a box or other receptacle, M, in which the sand is placed, as seen in the several figures. The upper portion is also recessed, as seen at N, for the passage of the valve. This valve consists of a curved blade, O, of metal, connected at either end to an arm, P, pivoted to the side of the sand-receptacle at *g*, as seen in Fig. 5. The valve is also provided with a cross-piece, R, as seen in Fig. 2, which constitutes the projections against which the projections K of the uprights H engage when the blade has passed through the bar of clay, whereby the arms P are tilted on their pivotal points and the valve O withdrawn from normal position, as seen in Fig. 4, whereby the sand is allowed to pass down upon the end of the blade.

As the arms P are tipped, as just described, their upper ends pass from under the trip-detents S, allowing the springs T to force the detents down upon the shoulders U of said arms. This engagement of the detents with the arms holds the latter in said position and maintains the valve in a raised position during the descent of the blade, allowing the sand to follow the incision it has made in the bar of clay, both by force of gravity and by reason of the partial vacuum the receding motion of the blade creates. When the blade has reached the position shown in Fig. 1, the upper projections on the uprights H have reached the detents S and moved them away from the shoulders of the arms P, whereby the springs V, which normally tend to throw the valve back into normal position, are allowed to act upon the valve and cut off the further flow of sand.

Thus it will be observed that the sand remains cut off during the upward movement of the blade, and as the blade nears the limit of that movement and just passes through the bar of clay the valve automatically recedes and allows the sand to start to descend; that the blade then descends and the sand follows it and fills the channel it has made through the bar, and thereby coats the adjacent ends of the bar and the brick which has been cut therefrom, and that as the blade reaches its lower limit the valve returns to normal position and cuts off the further flow of sand. In this position the parts remain until the bar of clay has been projected another brick length beyond the blade, the wall of sand intervening the brick already cut off and the adjacent end of the bar, and as the bar forces the brick rearward the sand is embedded effectually in the ends of both, and a thorough coating thus secured.

Of course the movements of the blade are timed with respect to the movement of the bar of clay; but the mechanism for this purpose forms no part of the present invention, that being left to a subsequent occasion. The movements of the blade, however, are rapid—that is to say, the blade passes rapidly across the die and back again, so as not to retard the bar of clay too long. Any retardation of it, however, only tends to make it more compact, and thereby acts advantageously.

While I have shown the mechanism for actuating the valves by the movements of the blade, and while I prefer this arrangement, I want it understood that should the valve be actuated independently of the blade, and yet with substantially such relation thereto as I have described, this change would still be within my invention. Moreover, changes in the form and construction of the parts may be made without departing from the gist of my invention.

Among the advantages of this machine, it may be stated that the brick as now ordinarily made by machines will acquire a new quality (and one much needed) when operated upon by my invention.

Having thus fully described my invention, what I claim as new, and desire to secure by Letters Patent, is—

1. The combination, with a brick-forming die, of a blade mounted to reciprocate across it, a valve, and a sand-passage leading into the die and opened and closed by said valve, and mechanism to operate the blade and the valve.

2. The combination, with a brick-forming die, of a blade mounted to reciprocate across it, a valve located opposite the blade, and a sand-passage leading into the die opposite the blade and opened and closed by the said valve, a bar or projection connected with the blade and arranged to engage the valve and open the passage as the blade nears the limit of its cutting stroke, and a trip which holds the valve in an open position during the reverse movement of the blade until it nears the limit of the said movement, and devices carried by the blade to release said trip when the blade is in the said latter position.

3. The combination, with a brick-forming die having a slot in the one side and a sand-passage leading into it at an opposite point, of a reciprocating blade fitted in said slot, a valve located across the sand-passage, and pivotal arms, to which the valve is connected, springs which hold the valve in a closed position, spring-actuated detents which engage the ends of said arms, bars connected with the blade and having projections which engage the valve when the blade accomplishes its cutting stroke, and other projections which engage said detents and release the pivotal arms when the blade reaches its reverse limit of movement, and mechanism which actuates the blade.

4. The combination, with a brick-forming die, one wall of which is recessed, of a sand-receptacle leading into the die adjacent to said recess, and a curved valve fitted in said recess, pivotal arms connected with the valve, detents arranged to engage the free ends of the said arms, and springs to return the valve to normal position.

5. The combination, with a brick-forming die, of a blade mounted to reciprocate across the same and mechanism to actuate said blade.

6. The combination, with a brick-forming die, of a blade or cutter arranged to move transversely to the die and through a bar of clay, and to form a partial vacuum when withdrawn from the severed bar, and a sand-supply passage or duct leading between the severed ends of the bar, to coat said ends as the bar forces the severed brick from the die, and suitable operating mechanism.

In testimony whereof I affix my signature in presence of two witnesses.

PETER G. ZOUCK.

Witnesses:
H. CLAY TUNIS,
L. P. DODGE.